US012399758B2

(12) United States Patent
Martin et al.

(10) Patent No.: US 12,399,758 B2
(45) Date of Patent: Aug. 26, 2025

(54) MOBILE APPLICATION INTEGRATION

(71) Applicant: Visa International Service Association, San Francisco, CA (US)

(72) Inventors: Philippe Martin, San Jose, CA (US); Marc Kekicheff, Foster City, CA (US); Yuexi Chen, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 301 days.

(21) Appl. No.: 17/632,386

(22) PCT Filed: Aug. 10, 2020

(86) PCT No.: PCT/US2020/045637
§ 371 (c)(1),
(2) Date: Feb. 2, 2022

(87) PCT Pub. No.: WO2021/026534
PCT Pub. Date: Feb. 11, 2021

(65) Prior Publication Data
US 2022/0291979 A1 Sep. 15, 2022

Related U.S. Application Data

(60) Provisional application No. 62/884,432, filed on Aug. 8, 2019.

(51) Int. Cl.
*G06F 9/54* (2006.01)
*G06Q 20/32* (2012.01)
(Continued)

(52) U.S. Cl.
CPC .......... *G06F 9/547* (2013.01); *G06Q 20/322* (2013.01); *G06Q 20/326* (2020.05);
(Continued)

(58) Field of Classification Search
CPC .. G06F 8/71; G06F 9/547; G06F 8/31; G06Q 20/322; G06Q 20/326; G06Q 20/3276;
(Continued)

(56) References Cited

U.S. PATENT DOCUMENTS 8,380,177 B2 * 2/2013 Laracey ............. G06Q 30/0253
455/414.1
9,779,393 B2 10/2017 Abadir et al.
(Continued)

FOREIGN PATENT DOCUMENTS

CN  105631656      6/2016
CN  107087432 A    8/2017
(Continued)

OTHER PUBLICATIONS

PCT/US2020/045637 , "International Search Report and Written Opinion", Nov. 25, 2020, 11 pages.
(Continued)

*Primary Examiner* — Kevin L Young
*Assistant Examiner* — Jennifer Marie Gutman
(74) *Attorney, Agent, or Firm* — Kilpatrick Townsend & Stockton LLP

(57) ABSTRACT

Methods and systems are disclosed for enabling transaction processing utilizing a single device. A mobile device can store an application comprising first and second software modules. One module may execute acceptance processing while another software module may emulate a transaction device associated with a user. One or more identifiers (e.g., QR codes, bar codes) may be obtained corresponding to one or more physical items. Authorization may be requested via the mobile device. In response, data may be exchanged between the software modules and this data (e.g., transaction data, a payment token, a cryptogram, etc.) may be provided to a remote computer (e.g., a cloud based acceptance ser-
(Continued)

vice) that can generate an authorization request message for the transaction.

20 Claims, 4 Drawing Sheets

(51) Int. Cl.
    *G06Q 20/40*         (2012.01)
    *H04W 4/50*         (2018.01)

(52) U.S. Cl.
    CPC ....... *G06Q 20/3276* (2013.01); *G06Q 20/401* (2013.01); *H04W 4/50* (2018.02)

(58) Field of Classification Search
    CPC ............. G06Q 20/3278; G06Q 20/382; G06Q 20/401; G06Q 30/326; H04W 4/50; H04W 12/06; H04W 12/084; H04W 12/71; H04W 12/77; H04L 63/083; H04L 63/0807; H04L 63/0861; H04L 63/20; H04L 67/10
    See application file for complete search history.

(56) References Cited

U.S. PATENT DOCUMENTS

| | | | |
|---|---|---|---|
| 10,607,212 B2 | 3/2020 | Sheets et al. | |
| 11,042,872 B2* | 6/2021 | Bergeon | G06Q 20/382 |
| 11,134,065 B2 | 9/2021 | Amar et al. | |
| 11,475,447 B2* | 10/2022 | Main | G06Q 20/401 |
| 2012/0246079 A1* | 9/2012 | Wilson | G06Q 20/3226 |
| | | | 705/67 |
| 2013/0282566 A1* | 10/2013 | Davis | G06Q 20/023 |
| | | | 705/39 |
| 2013/0311313 A1* | 11/2013 | Laracey | G06Q 20/3278 |
| | | | 705/16 |
| 2014/0046847 A1* | 2/2014 | Jacobs | G06Q 20/405 |
| | | | 705/44 |
| 2015/0312038 A1 | 10/2015 | Palanisamy | |
| 2015/0332262 A1* | 11/2015 | Lingappa | G06Q 20/3823 |
| | | | 705/71 |
| 2015/0339659 A1 | 11/2015 | Ballesteros | |
| 2016/0203452 A1 | 7/2016 | Bae | |
| 2017/0017958 A1* | 1/2017 | Scott | G06Q 20/40 |
| 2017/0169420 A1* | 6/2017 | Setlur | G06Q 20/40145 |
| 2017/0262832 A1* | 9/2017 | Deshpande | G06Q 20/20 |
| 2017/0278096 A1* | 9/2017 | Chitalia | G06Q 20/20 |
| 2017/0366530 A1 | 12/2017 | Dominguez et al. | |
| 2018/0032985 A1* | 2/2018 | Wolter | G06Q 20/405 |
| 2018/0204206 A1 | 7/2018 | Flurscheim et al. | |
| 2019/0066089 A1* | 2/2019 | Miryala | G06Q 20/367 |

FOREIGN PATENT DOCUMENTS

| | | |
|---|---|---|
| CN | 109074578 A | 12/2018 |
| KR | 101955427 B1 | 3/2019 |

OTHER PUBLICATIONS

EP20850520.6, "Extended European Search Report", Sep. 5, 2022, 9 pages.
EP20850520.6, "Supplemental European Search Report", Sep. 22, 2022, 1 page.
CN202080056092.9 , "Office Action", Jul. 4, 2024, 23 pages.
SG11202201095V , "Written Opinion", Jan. 8, 2025, 8 pages.

* cited by examiner

MOBILE APPLICATION INTEGRATION

CROSS-REFERENCE TO RELATED APPLICATIONS

This application is a National Stage of International Application No. PCT/US2020/045637, filed on Aug. 10, 2020, which claims the benefit of U.S. Provisional Application No. 62/884,432, filed on Aug. 8, 2019, which is herein incorporated by reference in their entirety for all purposes.

BACKGROUND

Advances in the capabilities of mobile devices have allowed mobile devices such as smart phones to be used as instruments to conduct contactless transactions. For example, a mobile device can be placed in proximity to an access device (e.g., a POS terminal or a transit terminal) to transfer account information from the mobile device to the access device to conduct a transaction. In a conventional transaction such as this, the user of the mobile device needs to collect any items to be obtained, and then take them to the access device to conduct the transaction. This can be cumbersome and time consuming, especially if a line is present at the access device.

Other ways have been developed to allow faster processing regarding the acquisition of resources. For example, some mobile phone applications can allow a user to conduct transactions, even if they are at a resource provider such as a merchant. However, methods and systems that can accomplish this are not as secure (compared to transactions conducted with a physical card with credentials stored on it). In such cases, the user's credentials might be stored on a remote computer as a credential-on-file. When this is done, the remote computer could be subjected to hacking and needs to have strict data storage requirements.

Embodiments of the invention address these and other problems individually and collectively.

BRIEF SUMMARY

One embodiment of the invention is directed to a method. The method includes receiving, at a first software module on a mobile device, one or more identifiers associated with one or more physical items external to the mobile device. The mobile device comprising the first software module configured to execute acceptance processing and a second software module configured to emulate a user device associated with a user. The one or more identifiers are read by the mobile device using an input component. The first software module can then receive an indication that an authorization request is to be initiated. The first software module and the second software module of the mobile device then exchange interaction data associated with the one or more physical items and a token associated with the user by first providing, by the first software module, an API call comprising the interaction data to the second software module, and second receiving, by the first software module, an API response comprising the token from the second software module. The first software module then transmits the interaction data and the token associated with the user to a remote computer to cause the remote computer to generate an authorization request message comprising the interaction data and the token.

Another embodiment of the invention is directed to a mobile device comprising one or more processors and one or more memories storing computer executable instructions that, when executed by the one or more processors, cause the mobile device to perform the following operations. The mobile device comprises a first software module configured to execute acceptance processing and a second software module configured to emulate a user device associated with a user. The operations include receiving at the first software module on the mobile device one or more identifiers associated with one or more physical items external to the mobile device. The one or more identifiers can be read by the mobile device using an input component. The operations further include the first software module receiving an indication that an authorization request is to be initiated. The first software module and the second software module of the mobile device can then exchange interaction data associated with the one or more physical items and a token associated with the user. The exchange can be performed by the first software module providing an API call comprising the interaction data to the second software module. The first software module then receives an API response comprising the token from the second software module. After exchanging, the first software module transmits the interaction data and the token associated with the user to a remote computer to cause the remote computer to generate an authorization request message comprising the interaction data and the token.

Another embodiment of the invention is directed to a system comprising a remote computer and a mobile device. The mobile device includes one or more processors and one or more memories storing computer executable instructions that, when executed by the one or more processors, cause the mobile device to perform the following operations. The mobile device comprises a first software module configured to execute acceptance processing and a second software module configured to emulate a user device associated with a user. The first software module on the mobile device receives one or more identifiers associated with one or more physical items external to the mobile device. The one or more identifiers are read by the mobile device using an input component. The first software module receives an indication that an authorization request is to be initiated. The first software module and the second software module of the mobile device exchange interaction data associated with the one or more physical items and a token associated with the user. The first software module and the second software module can exchange the data by the first software module providing an API call comprising the interaction data to the second software module and then receiving an API response comprising the token from the second software module. The operations further include the first software module transmitting the interaction data and the token associated with the user to the remote computer to cause the remote computer to generate an authorization request message comprising the interaction data and the token.

Further details regarding embodiments of the invention can be found in the Detailed Description and the Figures.

DETAILED DESCRIPTION

Figure 1:
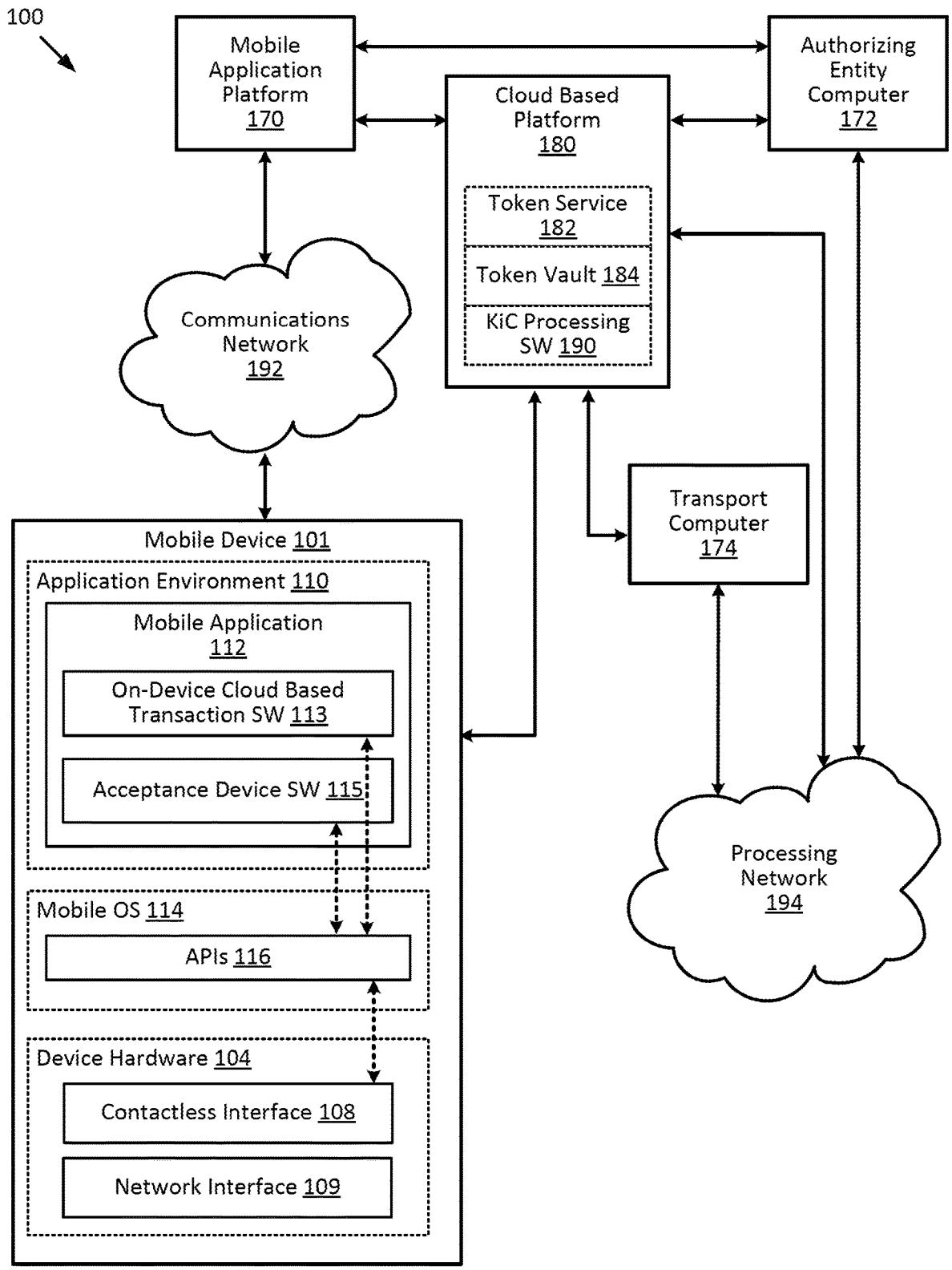
FIG. 1 shows a block diagram illustrating a cloud based transaction systems 100, according to embodiments.

Prior to discussing embodiments of the invention, some terms can be described in further detail.

A "mobile device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "user device" may include any suitable device that can be operated by a user. For example, a user device can be used to conduct a financial transaction, such as to provide payment credentials to a merchant. Suitable user devices can be hand-held and compact so that they can fit into a user's wallet and/or pocket (e.g., pocket-sized). Example user devices may include smart cards, keychain devices (such as the Speedpass™ commercially available from Exxon-Mobil Corp.), etc. Other examples of user devices include payment cards, smart media, transponders, and the like. If the user device is in the form of a debit, credit, or smartcard, the user device may also optionally have features such as magnetic stripes. Such devices can operate in either a contact or contactless mode.

An "interaction" can include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

"Interaction data" can include data related to and/or recorded during an interaction. In some embodiments, interaction data can be transaction data. Interaction data can include data that is used to process and complete an interaction. For example, interaction data can include an amount (e.g., transaction amount, amount of data, and amount of time, etc.). Interaction data can include transaction codes, currency codes, dates and/or times, resource provider identifiers, and/or any other suitable data utilized in an interaction. Interaction data can include a value or amount, information associated with a first party (e.g., an alias, identifiers, a contact address, etc.), information associated with a second party (e.g., an alias, a device identifier, a contact address, etc.), one-time values (e.g., a random value, a nonce, a timestamp, a counter, etc.), and/or any other suitable information.

A "credential" may be any suitable information that serves as reliable evidence of worth, ownership, identity, or authority. A credential may be a string of numbers, letters, or any other suitable characters, as well as any object or document that can serve as confirmation.

"Payment credentials" may include any suitable information associated with an account (e.g. a payment account and/or transaction device associated with the account). Such information may be directly related to the account or may be derived from information related to the account. Examples of account information may include a PAN (primary account number or "account number"), user name, expiration date, and verification values such as CVV (card verification value), dCVV, CVV2, dCVV2, and CVC3 (card verification code 3) values.

A "token" may be a substitute value for a credential. A token may be a string of numbers, letters, or any other suitable characters. Examples of tokens include payment tokens, access tokens, personal identification tokens, etc. For example, a token can include an identifier for an account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a transaction or represent the original credential in other systems where the original credential would typically be provided. In some embodiments, a token may be generated such that the recovery of the original PAN or other account identifier from the token value may not be computationally derived. Further, in some embodiments, the token format may be configured to allow the entity receiving the token to identify it as a token and recognize the entity that issued the token.

A "user" may include an individual. In some embodiments, a user may be associated with one or more personal accounts and/or mobile devices. The user may also be referred to as a cardholder, account holder, or consumer in some embodiments.

A "resource provider" may be an entity that can provide a resource such as goods, services, information, and/or locations. Examples of resource providers includes merchants, data providers, transit agencies, governmental entities, venue and dwelling operators, etc. A "merchant" may typically be an entity that engages in transactions and can sell goods or services, or provide access to goods or services.

A "physical item" can include a tangible and/or visible object. A physical item can be a resource provided by a resource provider at a resource provider location (e.g., physical items listed for purchase at a store). An example of a physical item can be a box, a sheet with printing on it, an object such as a household appliance, etc. In some embodiments, a physical item can have an identifier printed on a surface of the physical item.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An authorizing entity may operate an authorization computer.

An "issuer" may typically refer to a business entity (e.g., a bank) that maintains an account for a user. An issuer may also issue payment credentials stored on a portable device, such as a cellular telephone, smart card, tablet, or laptop to the user.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a mobile communication or transaction device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a transaction device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a transaction device or payment account. The authorization request message may include an issuer account identifier that may be associated with a transaction device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying physical items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. PA equipment) that indicates approval of the transaction. The code may serve as proof of authorization.

A "rules engine" may be computer code that is capable of executing rules. In some embodiments, there may be a rules engine on a thin client. The rules engine may process chaining messages and chaining events from and to the remote computer. In some embodiments, the rules engine may make limited local decisions based on the rules fetched from the remote computer or any other suitable device. In other embodiments, rules may be transmitted from the remote computer to the rules engine on the thin client.

"Configuration data" can define a set of rules. For example, configuration data can define a set of rules associated with interaction processing. For example, configuration data can include interaction scripts/rules and/or configuration information for an interaction to be processed between the a first software module and a second software module. For example, upon receiving configuration data, a first software module can be configured according to the configuration data (e.g., prepare to process an interaction based on transaction scripts/rules and/or configuration information received from a remote computer).

A "remote computer" can include a computer that is not proximate to another computer. An example of a remote computer may be a Web server that is located far away from a client computer that attempts to communicate with the Web server.

An "application" can include a program or piece of software designed and written to fulfill a particular purpose of a user. Applications can be bundled with the computer (e.g., a mobile device) and its system software or published separately. The system software is involved with running the computer itself. An application can comprise one or more software modules that can provide functionality to the application. For example, an application can include two software modules that can communicate with one another via an application programming interface (API). Applications that are built for mobile platforms (e.g., mobile devices) can be referred to as mobile applications.

A "software module" can include a part of an application. An application can comprise one or more independently developed software modules that may not be combined until the application is linked and completed. A software module can contain one or more routines. For example, a software module can encapsulate code and data to implement a particular functionality. A software module can be pluggable with another software module that expects its interface (e.g., via an API).

An "application programming interface" or "API" can include a computing interface which defines interactions between multiple software modules. An API can define the types of API calls and/or API requests that can be made, how to make the API calls and/or the API requests, the data formats that should be used, the conventions to follow, etc. Through information hiding, APIs enable modular programming, which allows the use of the application programming interface independently of the implementation. In other words, a second software module can hide information from a first software module by only exposing certain information to the first software module through the application programming interface.

"Acceptance processing" can include a processing acceptance of an interaction. Acceptance processing can include any suitable active steps that can facilitate acceptance of a credential for the purpose of providing a resource such as access to a location, or a good or service.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Various embodiments provide for systems and methods that securely provide a first software module and a second software module in a single mobile application on a user device. The first software module executes as a thin client that enables data exchanges (e.g., exchanges of card data, terminal data, and/or the like) between the second software module and a remote computer (e.g., Kernel-in-the-cloud acceptance service). The second software module is configured to manage credentials, tokens, limited-use keys, and/or any suitable data corresponding to the user of the user device. The first software module and the second software module directly communicate with one another using API calls and responses. Such a system, provided by embodiments, allows a user to scan identifiers of physical items with the user device, and activate the first software module to gain access to the physical items (e.g., a secure location, a product, a service, secure data, etc.). The first software module and the second software module exchange interaction data associated with the one or more physical items and a token associated with the user. The token can be provided from the second software module to the first software module, such that the first software module provides the token and the interaction data to a remote computer. The remote computer requests authorization for the interaction from an authorizing entity computer and provides an authorization response message back to the first software module. The first software module can notify the user of the user device of whether or not the interaction is authorized.

Embodiments provide for a number of technical advantages. For example, a user can utilize a single device to scan an identifier of a physical item to request authorization to access the physical item. The user does not need to communicate with a resource provider in person to access the physical item. Further, the user does not need to provide their user device or other user device (e.g., a payment card) to an access device (e.g., a point-of-sale terminal, a secure location's door cardkey reader, etc.). The interaction is performed using credentials of the user (e.g., a token) to obtain the one or more physical items on the user device between the first software module and the second software module. Further, embodiments can use specific APIs to allow first and second software modules to communicate with each other, and the communications utilize protocols and data sets associated with secure, in person transactions conducted by a user with a user device such as a payment card at an access device such as a point of sale terminal. This allows the user to have the convenience of an electronic commerce transaction while retaining the security of an conventional in-person transaction using a physical user device such as a payment card.

FIG. 1 illustrates a cloud based transactions system 100, according to some embodiments. The core components of the cloud based transactions system 100 may include a cloud based platform 180 and a mobile application platform 170 to manage cloud based transactions conducted using the mobile device 101. The cloud based platform 180 may be a "remote computer," and may be implemented using one or more computing devices or computers, such as one or more server computers, and can be associated with or be operated by a cloud based service provider such as an authorizing entity (e.g., an issuer), payment processor, and/or other suitable entities.

For simplicity of illustration, a certain number of components are shown in FIG. 1. It is understood, however, that embodiments of the invention may include more than one of each component.

In some embodiments, the cloud based platform 180 may manage cloud based accounts, provide verification functions for cloud based transactions, manage lifecycle messages from authorizing entity computer 172 or the mobile application platform 170, as well as initiate lifecycle management events. The cloud based platform 180 may also assist authorizing entity computer 172 with post payment functionalities to mitigate the risk against counterfeit account parameters, and limit the exposure on account parameters stored on the device. For example, the cloud based platform 180 can be used to facilitate authorizing entity computer 172 requests for periodic post payment verification of payment transactions and/or validation of account parameters replenishment requests using post payment information.

Further, a transport computer 174 can facilitate in providing messages (e.g., authorization request messages, authorization response messages, etc.) between the cloud based platform 180 (e.g., from the KiC processing software 190) to the processing network 194. The transport computer 174 can be operated and/or maintained by an acquirer that is associated with a resource provider of the application environment 110 deployed to and/or installed on the mobile device 101.

The cloud based platform 180 may also implement a set of key management functions that manages issuer master derivation keys (MDKs) from which the limited-use keys (LUKs) for cloud based transactions may be derived. The cloud based platform 180 may implement a set of provisioning functions that manages the preparation and delivery of cloud based account parameters (e.g., alternate account identifier or token, initial LUK and associated key index, etc.) to the mobile application platform 170 for the initial setup of the mobile application 112 on the mobile device 101. The cloud based platform 180 may also manage the cloud based accounts for processing by authorizing entity computer 172, and may perform active account management functions such as functions to generate account parameters based on requests or the risk profile of the cloud based account per the cloud based platform 180 risk management parameters. The cloud based platform 180 may also maintain the account status for each cloud based account, and manage the replenishment or refreshing of the account parameters.

In some embodiments, the cloud based platform 180 may also implement or be provided with access to a token service 182 and/or a token vault 184. Token service 182 can be used to generate, process, and maintain tokens, which are substitute identifiers for account identifiers. During a transaction, instead of using a real account identifier (e.g., a primary account number (PAN)) to identify the account of the user, a token can be used instead to identify the account. By using a token as a substitute for an account identifier, the risk of comprising real account information can be mitigated. As indicated above, a token may have its own set of use restrictions, and token service 182 may manage the deployment and usage of the tokens according to their use restrictions. Token service 182 may be in communication with token vault 184 where the generated tokens are stored. Specifically, token vault 184 may maintain a mapping between a token and the real account identifier (e.g., PAN) represented by the token. During transaction processing, token vault 184 may be queried to retrieve the real account identifier or PAN associated with the token.

In some embodiments, on-device cloud based transaction software 113 (which may be an example of a "second software module") may be configured to emulate a transaction device (e.g., a smart card, a credit card, a debit card, etc.). The functionality typically provided by a portable device (e.g., data exchanges between a card and an access device) may be emulated by the on-device cloud based transaction software 113).

In some embodiments, the cloud based platform 180 may also implement a Kernel-in-the-cloud acceptance service (e.g., (KiC) processing software 190). In some embodiments, the KiC processing software 190 may be configured to provide a payment acceptance service that is accessible by the mobile device 101 (e.g., via acceptance device software 115, which may be an example of a "first software module"). In some embodiments, the KiC may include functions, logic, and/or data used for processing contact or contactless transactions initiated by a portable device (e.g., the mobile device 101). The KiC processing software 190 can provide functionality that conventionally would have been provided by an access device. In some embodiments, the KiC processing software 190 provides registration functionality that enables the acceptance device software 115 to register with the KiC processing software 190. Once registered, the acceptance device software 115 may be utilized to pass data between the on-device cloud based transaction software 113 and the KiC processing software 190. In some embodiments, the acceptance device software 115 may execute as a thin client that enables data exchanges (e.g., exchanges of card data, terminal data, or the like) between the on-device cloud based transaction software 113 and the KiC processing software 190. The acceptance device software 115 may be configured to translate data between a first communications protocol utilized by the on-device cloud based transaction software 113 and a second communications protocol utilized by the KiC processing software 190 when the communication protocols differ between the two. In some embodiments, the acceptance device software 115 may be configured to communicate directly with the KiC processing software 190 via the communications network 192 (e.g., the Internet, a cellular network, a wireless network, etc.). However, in some embodiments, the acceptance device software 115 may communicate with the KiC processing software 190 via a separate platform (not depicted) that hosts the acceptance device software 115 executing at the mobile device 101. Although depicted as a part of the mobile application 112, acceptance device software 115 may execute as part of a different application executing on the mobile device 101.

In some embodiments, the acceptance device software 115 may execute, at least in part, as a rules engine. While operating as a rules engine, the acceptance device software 115 may process chaining messages and chaining events from and to the KiC processing software 190. In some embodiments, the acceptance device software 115 may make limited local decisions based on the rules fetched from, or provided by, the KiC processing software 190 or any other suitable device. Accordingly, the particular message protocol followed for providing and/or obtaining data to/from the on-device cloud based transaction software 113 and/or the KiC processing software 190 may be performed by the acceptance device software 115 according to these rules. These rules may be provided (e.g., by the KiC processing software 190) in any suitable format and the acceptance device software 115 may be configured to interpret these rules in order to drive the messaging protocol/data exchange between the on-device cloud based transaction software 113 and the KiC processing software 190. In some embodiments, the acceptance device software 115 may be configured to establish a secure channel with the KiC processing software 190 such that data exchanged between the two is encrypted and secure.

In some embodiments, the mobile application platform 170 is used to facilitate communications between the on-device cloud based transaction software 113 (e.g., operating as part of mobile application 112 or a separate application) executing on the mobile device 101 and other entities in cloud based transactions system 100 such as the cloud based platform 180 and/or authorizing entity computer 172, etc. The mobile application platform 170 may communicate with the mobile device 101 via a communications network 192 such as the Internet. In some environments, the mobile device 101 may not always have constant network connectivity, and thus one role of the mobile application platform 170 may be to intermediate requests between the on-device cloud based transaction software 113 and the other entities in the cloud based transactions system 100 to ensure that requests and responses involving on-device cloud based transaction software 113 are fulfilled as soon as network connectivity to the mobile device 101 is established. The mobile application platform 170 may be referred to as a remote computer, and may be implemented using one or more computing devices or computers such as one or more server computers, and can be associated with or be operated by the provider of mobile application 112. The provider of mobile application 112 can be, for example, an issuer, a bank, a third-party mobile wallet provider, a merchant, or other suitable entities. In some embodiments, the mobile application platform 170 can be associated with or be operated by the same entity as the cloud based platform 180, or they can be separate. Although the mobile application platform 170 is illustrated as a separate logical entity in FIG. 1 because the cloud based platform 180 may not, in some cases, communicate directly with the mobile devices. Although in some use cases, the cloud based platform 180 could communicate directly with the mobile devices (e.g., via the acceptance device software 115), it should be understood that in some embodiments, some or all of the functionalities of the mobile application platform 170 may be integrated as part of the cloud based platform 180. Examples of the mobile application platform 170 may include mobile banking platforms, mobile wallet platforms, and the like.

In some embodiments, the mobile application platform 170 may implement authentication functionalities to authenticate the mobile device 101 when the mobile device 101 communicates with the other entities in cloud based transactions system 100 via the mobile application platform 170. The authentication functionalities may ensure that a mobile device communicating with the system is an authorized mobile device and/or a mobile device that has not been hacked, infected with malware or virus, or otherwise been compromised. For example, the mobile application platform 170 may perform, request, or facilitate a device fingerprint of the mobile device 101 to capture the state of the mobile device 101 when the mobile device 101 communicates with the mobile application platform 170. The device fingerprint may, for example, capture information about the mobile device 101 such as the operating system and version, applications installed on the mobile device 101, memory usage, whether the mobile device 101 has been jail-broken, device identifiers such as a mobile device identifier, and/or other suitable device characteristics.

The mobile application platform 170 may verify the device fingerprint of the mobile device 101 for each communication session established with the mobile device 101 or periodically (e.g., once every five communication sessions, once a month, etc.). If the device fingerprint of a mobile device indicates that the mobile device is not an authorized device for an account (e.g., the mobile device requesting replenishment of account parameters is a different device than the original device that was used to enroll the account), or if the device fingerprint indicates that the mobile device may potentially be hacked, the mobile application platform 170 may prevent the mobile device from communicating with the system and alert the issuer that the mobile device may have been compromised.

The mobile application platform 170 may perform enrollment functions to enroll a mobile cardholder into a cloud based transactions program, and a set of provisioning functions that facilitates the preparation and delivery of the account parameters, configuration, and cloud based payments device threshold parameters to mobile application 112. The mobile application platform 170 may perform account parameters replenishment functions to facilitate the account parameter replenishment process for the cloud based account provisioned on the mobile device 101, and lifecycle management functions that manage lifecycle messages from authorizing entity computer 172, the cloud based platform 180, and/or mobile application 112. The mobile application platform 170 may also perform post-payment functions to mitigate the risk against counterfeit account parameters, and to limit the exposure on account parameters stored on the mobile device 101, such as facilitating periodic post payment verification of payment transactions or the use of post payment information to validate account parameters replenishment requests.

In cloud based transactions system 100, the mobile device 101 can be used to conduct cloud based transactions facilitated by the cloud based platform 180 and/or the mobile application platform 170. The components in the mobile device 101 may include device hardware 103, a mobile operating system (OS) 114, and an application environment 110 in which mobile application 112 may reside. Mobile application 112 can include multiple distinct software modules (e.g., the on-device cloud based transaction software 113 and the acceptance device software 115), or separate applications providing the functionality described in connection with these software modules may be included within application environment 110. Device hardware 104 may include a contactless interface 108. Examples of contactless interface 108 may include one or more radio frequency (RF) transceivers that can send and receive communications using near-field communications (NFC), or other radio frequency or wireless communication protocols such as Bluetooth, Bluetooth low-energy (BLE), Wi-Fi, iBeacon, etc. In some embodiments, contactless interface 108 may include a contactless reader (not shown) or the contactless interface 108 may be in communications with a contactless reader. Device hardware 104 may further include network interface 109 which can be configured to communicate via any suitable communications protocol such as the protocol utilized by the communications network 192 (e.g., the Internet, a cellular network, a wireless network, etc.).

Application environment 110 of the mobile device 101 may host a portion of mobile application 112 (e.g., on-device cloud based transaction software 113) provided by a mobile application provider. For example, mobile application 112 may be a user's own mobile application from which the user can conduct e-commerce or point of sale transactions with a merchant. In some embodiments, the mobile application 112 can support multiple merchants (e.g., via multiple instances of acceptance device software 115 that may individually be hosted and/or provided by separate merchants).

According to some embodiments, mobile application 112 may include on-device cloud based transaction software 113. On-device cloud based transaction software 113 can be in the form of a software developer kit (SDK)) integrated into mobile application 112 to support cloud based transaction functionalities. The on-device cloud based transaction software 113 may perform functions to facilitate cloud based transactions such as to take the account parameters (e.g., LUK and associated key index), generate transaction cryptograms, and deliver them to mobile operating system 114 for transmission over network interface 109. Network interface 109 may be configured to utilize any suitable wireless communications protocol. The on-device cloud based transaction software 113 may also manage the initial service profile parameters (e.g., limited-use thresholds) that are provided after an account has been provisioned to ensure that requests for account parameter replenishment and other account parameter management activities are initiated.

Mobile application 112 may perform functions to manage the risk profile of the cloud based account, maintain the account status, and replenish account parameters for each cloud based account based on the on-device threshold management parameters. Mobile application 112 may also manage lifecycle messages from authorizing entity computer 172 or lifecycle messages from the mobile application platform 170. Mobile application 112 may perform a set of functions to enroll a mobile cardholder into a cloud based transactions program, and a set of functions that manages the receiving and configuration of the cloud based account parameters and cloud based payments device threshold parameters received from the mobile application platform 170. Mobile application 122 may also provide consumer device cardholder verification method (CDCVM) functions for cloud based transactions, and perform a set of functions that processes and responds to messages in support of post-payment processing to limit the exposure of account parameters stored on the mobile device. For example, post-payment processing may include periodic post-payment verification of payment transactions or using post-payment information to validate account parameters replenishment requests.

According to some embodiments, mobile application 112 may include the acceptance device software 115. Acceptance device software 115 can also be in the form of a software developer kit (SDK) (e.g., an SDK that is different from the SDK of the on-device cloud based transaction software 113) integrated into mobile application 112 to support cloud based transaction functionalities. In some embodiments, the acceptance device software 115 may communicate with the KiC processing software 190 to exchange transaction data and/or card data.

In some embodiments, APIs 116 are provided to enable data to be exchanged between on-device cloud based transaction software 113 and acceptance device software 115. For example, APIs 116 may be coded for and be executed from mobile operating system 114 of the mobile device 101, and may include programming function calls to allow on-device cloud based transaction software 113 and acceptance device software 115 to exchange transaction data and/or card data between one another.

Once the mobile device 101 and mobile application 112 have been provisioned with the account parameters, on-device cloud based transaction software 113 can conduct cloud based transactions by interacting with KiC processing software 190 through acceptance device software 115. Portable communications device 101 may include input components such as one or more RF transceivers that can send and receive communications using NFC or other radio frequency or wireless communication protocols such as Bluetooth, BLE, Wi-Fi, iBeacon, etc. In some embodiments, portable communications device 101 may include input components such as an optical code scanner, or reader, or camera, to conduct transactions using QR codes (quick response codes), bar codes, etc.

To conduct a cloud based transaction, a user may download and install mobile application 112. Using an interface provided by the mobile application 112, the user may store payment credentials (e.g., a payment account number, expiration date, CW code, billing address, etc.). Mobile application 112 may be utilized to capture one or more identifiers (e.g., bar codes, QR codes, etc.) of one or more physical items. When the user is ready, a selection may be made at a user interface provided by the mobile application 112 to indicate that a transaction is to be commenced. By way of example, the user may select a "checkout option" to initiate a transaction. The transaction may be performed utilizing the on-device cloud based transaction software 113 to emulate card functionality while the acceptance device software communicates data between the on-device cloud based transaction software 113 and the KiC processing software 190 which is performing cloud based acceptance processing (e.g., functionality traditionally provided by a merchant access device). Accordingly, the user may his own device to select physical items to purchase and conduct a payment transaction independent of an additional device operated by the merchant.

Mobile application 112 may be a merchant-specific application (e.g., an in-store application). Subsequently, the user of the portable communications device 101 may scan physical items and initiate a transaction. Transaction data may be received by acceptance device software 115 and payment credentials may be requested by the acceptance device software 115 from the on-device cloud based transaction software 113. The on-device cloud based transaction software 113 may provide the acceptance device software 115 (e.g., via the APIs 116) with an identifier (e.g., an account identifier such as a PAN, an alternate account identifier such as an alternate PAN, or a token, etc.) to identify the account of the user and additional information such as the limited-use account parameters or information derived from the limited-use account parameters (e.g., transaction cryptograms generated from a LUK). For example, in some embodiments, an account identifier or token, and additional information (e.g., a transaction cryptogram, account parameters, etc.) can be transmitted to KiC processing software 190 via the acceptance device software 115 in messages that are responsive to a series of commands received from KiC processing software 190. KiC processing software 190 may generate an authorization request message including the account identifier or token, and additional information such as a transaction cryptogram and other transaction data, and forward the authorization request message to transport computer 174 associated with the merchant. The authorization request message can then be sent by transport computer 174 to processing network 194.

Processing network 194 may include data processing subsystems, networks, and operations used to support and deliver authorization services, exception file services, transaction scoring services, and clearing and settlement services. An exemplary payment processing network may include VisaNet™. Payment processing networks such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

Upon receiving the authorization request message, processing network 194 may forward the authorization request message received from transport computer 174 to the corresponding authorizing entity computer 172 of the account of the user of the mobile device 101. After authorizing entity computer 172 receives the authorization request message, the authorization request message may be parsed, and the information in the authorization request message may be verified. For example, authorizing entity computer 172 may verify that the transaction cryptogram was generated by a valid LUK, and that the set of one or more limited-use thresholds associated with the LUK has not been exceeded. In some embodiments, some or all of the information in the authorization request message can also be sent to the cloud based platform 180 for verification and processing. For example, if authorizing entity computer 172 does not have the capability to verify the transaction cryptogram, the processing network 194 or authorizing entity computer 172 may forward the transaction cryptogram to the cloud based platform 180 for verification.

An authorization response message is then sent back to processing network 194 to indicate whether the current transaction is authorized (or not authorized). Processing network 194 then forwards the authorization response message back to transport computer 174. In some embodiments, processing network 194 may decline the transaction even if authorizing entity computer 172 has authorized the transaction, for example, depending on a value of a fraud risk score or depending if limited-use account parameters are verified by the cloud based platform 180. Transport computer 174 then sends the authorization response message to the KiC processing software 190, which in turn transmits an indication that the transaction was authorized or declined to the acceptance device software 115. This indication may be presented at the mobile device 101 by the acceptance device software 115 via any suitable interface.

At the end of the day, a clearing and settlement process can be conducted by processing network 194. A clearing process is a process of exchanging financial details between an acquirer and an issuer to facilitate posting to a user's payment account and reconciliation of the user's settlement position. It should be understood that any of the transport computer 174, processing network 194, authorizing entity computer 172, the cloud based platform 180, and/or the mobile application platform 170 may be referred to as a remote computer, and may include one or more computing devices such as one or more computers or server computers to enable the entity to communicate with the other entities in the cloud based transactions system 100, and/or to perform one or more of the functions described herein.

Additional information regarding the on-device cloud based transaction software 113 and limited use keys, can be found in U.S. Pat. No. 9,972,005, entitled "Cloud based Transactions Methods and Systems", issued May 15, 2018, the contents of which are incorporated by reference it its entirety for all purposes. Additionally, information regarding the KiC processing software 190 (also referred to as "kernel in the cloud") can be found in U.S. patent application Ser. No. 15/631,716, entitled "Adapter for Providing Unified Transaction Interface," filed Jun. 23, 2017, U.S. Provisional Application 62/641,712, entitled "Rules Engine for Communication Round Trips Optimization of Kernel-in-Cloud Payment Transaction," filed Mar. 12, 2018, each of which are incorporated by reference in their entirety for all purposes.

Figure 2:
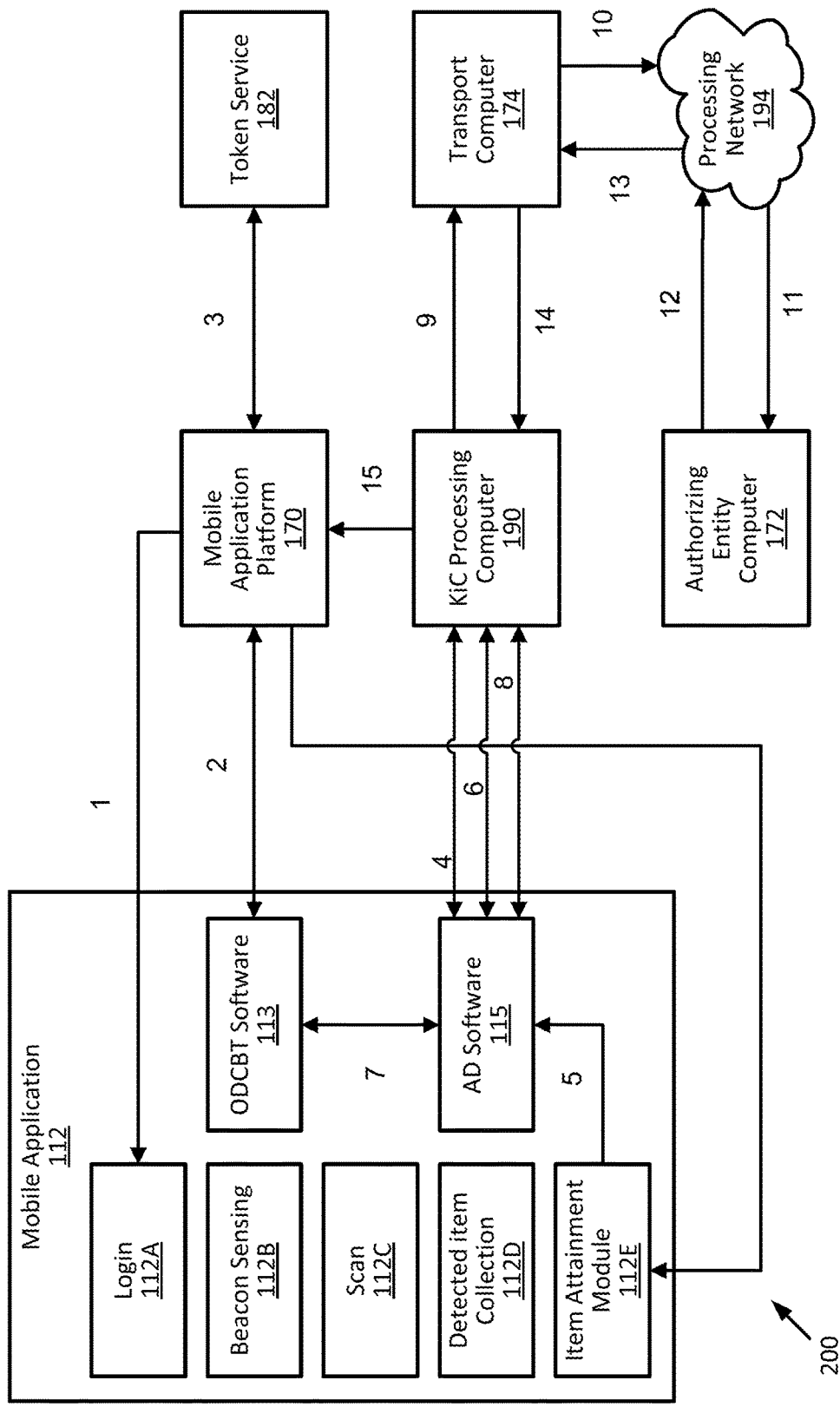
FIG. 2 shows a flowchart illustrating an interaction processing method according to according to embodiments.

FIG. 2 shows an exemplary method 200 according to an embodiment of the invention. The method 200 may be performed by the components of the cloud based transactions system 100 of FIG. 1. The steps described in connection with the method 200 may be performed in any suitable order. More or fewer steps may be included in some embodiments.

Prior to performance of the method 200, a user may download mobile application 112. As discussed above, mobile application 112 may be a merchant specific application. The method 200 may begin at step 1, where the user may login to a user account associated with the merchant. In some embodiments, the user may enter any suitable credentials (e.g., username, password, biometric inputs such as fingerprints, retina scans, facial detection, etc.). These credentials may be transmitted by the mobile application 112 to the mobile application platform 170 platform for authentication. If the credentials are valid, the user may be provided access to the functionality provided by the mobile application 112.

In some embodiments, the mobile application 112 may include a software module such as the on-device cloud based transaction (ODCBT) software 113. ODCBT software 113 may be configured to manage payment credentials, tokens, limited-use keys or any suitable data corresponding to the user. In some embodiments, the ODCBT software 113 may be configured to provide digital wallet functionality to the user.

At step 2, the user may utilize an interface provided by the ODCBT software 113 to enter payment credential information. By way of example, the user may enter a personal account number (PAN), expiration date, CVV, billing address, or the like. Once entered, the ODCBT software 113 may transmit the data to the mobile application platform 170. The mobile application platform 170 may be configured to store the data as being associated with a user account of the user.

At step 3, the mobile application platform 170 may request a token for the payment credential from the token service 182. Token service 182 may be configured to generate a token and associated the token with the payment credential information. In some embodiments, the token service 182 also generates a cryptogram. A cryptogram, in some embodiments, may be generated using a limited-use key (LUK) that is associated with a set of one or more limited-use thresholds that limits usage of the LUK. The token service 182 may generate the token and/or LUK and send this information to the ODCBT software 113 via the mobile application platform 170. The ODCBT software 113 may store such data in a secure memory space local to the portable communications device 101 of FIG. 1 and accessible to the ODCBT software 113. In some embodiments, the ODCBT software 113 may encrypt this data prior to storage. In this manner, the mobile application 112 may be provisioned with a token and cryptogram to conduct a subsequent transaction. The transaction can be authorized based on at least whether usage of the LUK has exceeded the set of one or more limited-use thresholds.

In at least some embodiments, the token may be generated by the token service 182 and the mobile device 101 may be provisioned with the LUK. Once provisioned, the mobile device 101 (e.g., the ODCBT software 113) may be configured to generate a cryptogram for a transaction. The token and cryptogram may be provided to any suitable computing component (e.g., the acceptance device software 115).

As an illustrative example, the ODCBT software 113 can receive user credentials (e.g., a PAN) via an interface provided by the ODCBT software 113 on the mobile application 112 via user input. The ODCBT software 113 can generate and transmit a token request comprising the user credentials to the mobile application platform 170. The mobile application platform 170 then requests the token for the user credentials from a token service 182. The token service 182 can determine the token associated with the user credentials if a token exists, otherwise the token service 182 can generate the token. The token service 182 then provides the token to the mobile application platform 170, which provides the token to the ODCBT software 113. The ODCBT software 113 then receives the token from the mobile application platform 170 and can store the token in any suitably secure manner.

At step 4, the acceptance device software 115 may conduct a registration process with the KiC processing computer 190. In some embodiments, the registration process may be performed upon installation of the mobile application 112 or at another suitable time. In some embodiments, the registration process may include provisioning a connection credential to the acceptance device software 115 that enables the acceptance device software 115 to connect and exchange information with the KiC processing computer 190. As discussed above, the KiC processing computer 190 may perform acceptance processing (e.g., point-of-sale terminal processing) in lieu of a physical (and in some cases mobile) access device.

At step 5, a user can engage in a shopping experience where he or she may scan bar codes and/or QR codes (or any suitable identifier) via a input device (e.g., an image capture device) of the user's mobile phone (e.g., an example of the mobile device 101). For example, the mobile application 112 can include a scan 112C module that can communicate with an image capture device to obtain one or more identifiers. The one or more identifiers can be collected by a detected physical item collection 112D module. Once the user is ready to proceed, the user can initiate an interaction using a physical item attainment module 112E to obtain the scanned physical items. For example, at some point in time, the user may wish to purchase the physical items and can select an option (e.g., such as a checkout button) to initiate a transaction for a total amount of the combined physical items (including, potentially, sales tax or other suitable fees, taxes, and/or surcharges). The acceptance device software 115 may be configured to receive the physical item information and calculate a total amount for the transaction.

The acceptance device software 115 can receive and/or generate interaction data based on the one or more identifiers received from the physical item attainment module 112E. The interaction data includes data related to and/or recorded during an interaction. For example, in some embodiments, interaction data can be transaction data. The transaction data can include amounts, transaction codes, currency codes, dates and/or times, resource provider identifiers, and/or any other suitable data utilized in an interaction or utilized by the ODCBT software 113 to determine whether or not to provide at least a token to proceed with the interaction.

At step 6, the acceptance device software 115 can retrieve any suitable transaction scripts/rules and/or configuration information from the KiC processing computer 190. For example, the acceptance device software 115 may be configured, at least in part, with a rules engine that may interpret rules provided by the KiC processing computer 190 defining a particular messaging protocol with which data is to be exchanged between the KiC processing computer 190 and the ODCBT software 113. The acceptance device software 115 may be configured to utilize these rules to facilitate the exchange of data between the KiC processing computer 190 and the ODCBT software 113. In some embodiments, the acceptance device software 115 may translate between one communication protocol of the ODCBT software 113 and another communication protocol of the KiC processing computer 190, should the protocols differ. In some embodiments, the acceptance device software 115 may obtain these rules at any suitable time (e.g., at registration or another suitable time).

Further, at step 6, the acceptance device software 115 provides the interaction data to the KiC processing computer 190. The KiC processing computer 190 provides configuration data defining a set of rules associated with interaction processing. For example, the configuration data includes the transaction scripts/rules and/or configuration information for the interaction to be processed between the acceptance device software 115 and the ODCBT software 113. Upon receiving the configuration data, the acceptance device software 115 can be configured according to the configuration data (e.g., prepare to process the interaction based on the transaction scripts/rules and/or configuration information).

At step 7, the acceptance device software 115 may execute operations according to the rules provided by the KiC processing computer 190 to obtain card data from the ODCBT software 113. The acceptance device software 115 may communicate with the ODCBT software 113 via any suitable API (e.g., APIs 116 of FIG. 1). For example, the acceptance device software 115 may request card data from the ODCBT software 113 via these APIs. The ODCBT software 113 may generate transaction data (e.g., EMV® card data) and provide this data to the acceptance device software 115 (e.g., via APIs 116). In some embodiments, the transaction data may include the token and/or cryptogram generated by the token service 182 and store in local memory at the mobile device 101.

For example, at step 7, the acceptance device software 115 can generate an API call. The API call can include a request for at least a token from the ODCBT software 113. In some embodiments, the API call can also include a request for a cryptogram that is associated with the token. For example, the token can be a substitute value for a credential (e.g., a PAN), while the cryptogram includes a piece of obscured text such as encrypted text (e.g., of a credential such as a dCVV (dynamic card verification value)). The acceptance device software 115 and the ODCBT software 113 can communicate using API calls and responses rather than APDU (application protocol data unit) commands and responses. The API calls and responses can comprise a larger amount of information than the APDU commands and responses, and as such, the acceptance device software 115 and the ODCBT software 113 can advantageously be configured to perform a transaction during a single round of communication.

The API call can include interaction data associated with the one or more physical items including, for example, transaction amount, currency code, resource provider identifier, a time, and/or any other suitable information that can describe the interaction and/or be utilized by the ODCBT software 113 to determine whether or not to proceed with the interaction. For example, in some embodiments, the API call can include acceptance device software 115 data, for example, including an acceptance device software identifier, an acceptance device software version number, an acceptance device software certificate, cryptographic keys attesting to the authenticity of the acceptance device software 115, etc. The acceptance device software 115 then provides the API call to the ODCBT software 113. The API call can be provided directly from the acceptance device software 115 to the ODCBT software 113, without passing through a module or hardware (e.g., a secure element) that is not a part of either the acceptance device software 115 or the ODCBT software 113.

Upon receiving the API call, the ODCBT software 113 determines whether or not to provide the token to the acceptance device software 115 based on the interaction data included in the API call. In some embodiments, the ODCBT software 113 can determine whether or not the acceptance device software 115 is authentic. For example, the ODCBT software 113 can verify an acceptance device software certificate, an acceptance device software public key, and/or an acceptance device software signature as known to one of skill in the art.

The ODCBT software 113 can determine whether or not to respond to the API call based on the validity of the API call and/or the acceptance device software 115. If the ODCBT software 113 determines to respond, then the ODCBT software 113 generates an API response. The API response includes the token. In some embodiments, the API response can further include a cryptogram associated with the token. The cryptogram can be generated by the ODCBT software 113. The ODCBT software 113 then provides the API response to the acceptance device software 115. The API response can be provided directly to the acceptance device software 115.

It should be appreciated that although acceptance device software 115 is described as obtaining card data from the ODCBT software 113, the acceptance device software 115 can be configured to obtain card data via contactless interface 108 of FIG. 1, in some embodiments. Thus, if the user wishes to use a transaction device other than the one known to the ODCBT software 113, the user may tap or otherwise bring the transaction device near the mobile device 101 such that acceptance device software 115 may receive the data via the contactless interface 108.

At step 8, the acceptance device software 115 may transmit the data obtained from the ODCBT software 113 to the KiC processing computer 190. In some embodiments, step 8 may include any suitable number of message and/or data exchanges between the ODCBT software 113 and the KiC processing computer 190 via the acceptance device software 115 (and APIs 116).

For example, at step 8, the acceptance device software 115 can provide the token to the KiC processing computer 190 after receiving the token from the ODCBT software 113. In some embodiments, if the interaction data was not provided to the KiC processing computer 190 at step 6, then the acceptance device software 115 can provide the interaction data along with the token to the KiC processing computer 190.

At step 9, the KiC processing computer 190 may process the transaction data to generate an authorization request message. The authorization request message can comprise at least the token and the interaction data. The authorization request message is transmitted to the transport computer 174.

At step 10, after receiving the authorization request message, the transport computer 174 provides the authorization request message to the processing network 194.

At step 11, after receiving the authorization request message, the processing network 194 provides the authorization request message to the authorizing entity computer 172. In some embodiments, the authorizing entity computer 172 can communicate with the token service 182 to obtain the credential (e.g., the PAN) associated with the token. The processing network 194 can modify the authorization request message to replace the token with the credential. The processing network 194 then provides the authorization request message comprising the interaction data and the credential to the authorizing entity computer 172 for authorization.

After receiving the authorization request message, the authorizing entity computer 172 determines whether or not to authorize or decline the interaction. For example, the authorizing entity computer 172 can accept or decline the interaction. The authorizing entity computer 172 can generate an authorization response message comprising an indication of whether or not the interaction is authorized. In some embodiments, the authorization response message can further comprise the interaction data. In other embodiments, the authorization response message can further comprise the token or the credential.

At step 12, after generating the authorization response message, the authorizing entity computer 172 transmits the authorization response message to the processing network 194.

At step 13, after receiving the authorization response message, the processing network 194 transmits the authorization response message to the transport computer 174. In some embodiments, if the authorization response message comprises the credential, then the processing network 194 can communicate with the token service 182 to obtain the token. The processing network 194 can then modify the authorization response message to replace the credential with the token prior to sending the authorization response message to the transport computer 174.

At step 14, after receiving the authorization response message from the processing network 194, the transport computer 174 transmits the authorization response message to the KiC processing computer 190.

At step 15, after receiving the authorization response message, the KiC processing computer 190 can provide the indication of authorization/declination (and, in some embodiments, the transaction data) to the mobile application platform 170. Upon receipt, or at another suitable time, the mobile application platform 170 and/or the KiC processing computer 190 may provide the indication of authorization/declination (and transaction data) via an interface provided by the mobile application 112. For example, the KiC processing computer 190 can provide the authorization response message or the indication of whether or not the interaction is authorized to the mobile application 112. The mobile application 112 can present the indication of whether or not the interaction is authorized to the user of the mobile application 112. In some embodiments, the indication of whether or not the interaction is authorized can allow the user to obtain the one or more physical items.

Figure 3:
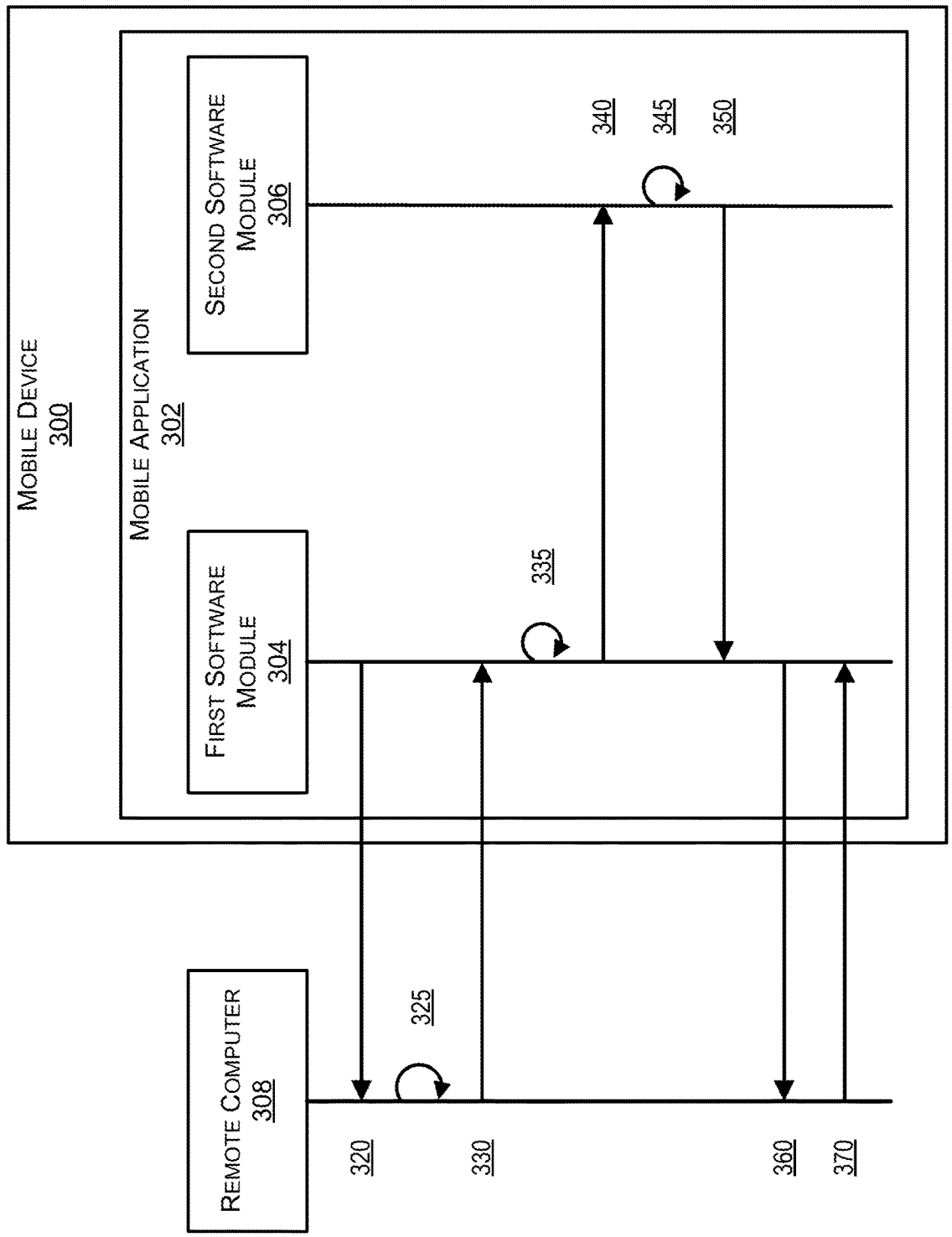
FIG. 3 shows a flowchart illustrating communication details between first and second software modules according to embodiments.

FIG. 3 shows a flowchart illustrating communication details between first and second software modules according to embodiments. The method illustrated in FIG. 3 will be described in the context of a first software module communicating with a second software module within an application on a mobile device. The method illustrated in FIG. 3 can be performed by a mobile device 300 comprising a mobile application 302 that includes a first software module 304 and a second software module 306, as well as a remote computer 308. It is understood, however, that the invention can be applied to other circumstances.

Prior to step 320, a user can utilize the mobile device 300 to scan or otherwise obtain one or more identifiers for one or more physical items. For example, the mobile device 300 can include an input element (now shown) that can be a scanner capable of capturing a QR code via a camera or other suitable means. The user can scan one or more identifiers using the mobile device 300 can then select to perform an interaction within the mobile application 302 to obtain and/or gain access to the one or more physical items. The first software module 304 can determine interaction data based on the one or more identifiers. For example, the first software module 304 can determine a total amount, a currency code, a resource provider identifier, etc. to include into the interaction data.

In some embodiments, the user can select a user device to utilize during the interaction. For example, the mobile device 300 can receive a selection of a selected user device of a plurality of user devices presented on the mobile device. For example, the user can be presented with two user devices. A first user device can emulated by the second software module 306. The second user device can be a physical device, which during the interaction, the user can bring into contact with the mobile device 300. As an example, the user can select the first user device to proceed with the interaction described below.

At step 320, the first software module 304 provides the interaction data to the remote computer 308. For example, the first software module 304 can communicate over the air with the remote computer 308. In some embodiments, the first software module 304 can request configuration data from the remote computer 308. The configuration data can include the transaction scripts/rules and/or configuration information for the interaction to be processed between the first software module 304 and the second software module 306. For example, the configuration data can include instructions for the first software module 304 to provide an API call to the second software module 306 to obtain at least a token. The configuration data can indicate the data that should be included in the API call from the first software module 304 to the second software module 306. For example, the configuration data can indicate that the API call includes data fields of an amount, a resource provider identifier, and an interaction environment selection of contact interaction.

At step 325, after receiving the interaction data from the first software module 304, the remote computer 308 can determine the configuration data to provide to the first software module 304 of the mobile application 302. For example, the remote computer 308 can store a plurality of configuration data corresponding to different interaction environments. The remote computer 308 can determine which configuration data of the plurality of configuration data to provide to the first software module 304 based on the interaction data. For example, the interaction data can include a first software module identifier. The remote computer 308 can determine that the first software module identifier indicates that the first software module 304 can perform an interaction in a contact-like interaction environment with the second software module 306, based on a pre-stored first software module identifier (e.g., received at step 4 of FIG. 2).

At step 330, the remote computer 308 then provides the configuration data to the first software module 304. In some embodiments, the remote computer 308 can provide an indication that an authorization request is to be initiated to the first software module.

At step 335, after receiving the configuration data from the remote computer 308, the first software module 304 can be configured according to the configuration data (e.g., prepare to process the interaction based on the transaction scripts/rules and/or configuration information). The first software module 304 generates an API call, based on the configuration data, to provide to the second software module 306. The API call can provide the interaction data to the second software module 306 in a format specified by the configuration data from the remote computer 308. Further, the API call can request data from the second software module 306. For example, the API call can request a token, a cryptogram, an expiration date, and/or any other suitable information maintained by the second software module 306 to emulate a user device.

At step 340, after generating the API call, the first software module 304 provides the API call to the second software module 306 directly.

At step 345, upon receiving the API call from the first software module 304, the second software module 306 determines whether or not to respond to the API call. For example, the second software module 306 can determine whether or not the first software module 304 is trusted, as described in further detail herein. The second software module 306 can then generate an API response comprising second software module data including, for example, the token.

At step 350, after generating the API response, the second software module 306 provides the API response to the first software module 304. In some embodiments, rather than performing several subsequent command and response messages between the first software module 304 and the second software module 306, the first software module 304 and the second software module 306 can communicate all of the data necessary for completing the interaction in a single API call and API response. For example, in some embodiments, rather than the second software module 306 providing, the token in response to a token request, then in a second response providing a cryptogram in response to a cryptogram request, the second software module 306 can provide both the token and the cryptogram (and any other suitable user device data emulated by the second software module 306) to the first software module 304 in a single message. This can be achieved since the first software module 304 and the second software module 306 do not need to follow standard APDU commands and response that can handle a smaller amount of data in each command/response.

The API call and the API response between the first software module 304 and the second software module 306 can be provided directly to the second software module 306 and the first software module 304, respectively. As such, embodiments do not need a hardware controller (e.g., controller element or controller module) to communicate between the first software module 304 and the second software module 306.

At step 360, after receiving the API response from the second software module 306, the first software module 304 provides the interaction data and the token associated with the user to the remote computer 308. The first software module 304 can provide data to the remote computer 308 based on the configuration data. For example, the configuration data can indicate what data should be provide to the remote computer 308 at step 360, and in what format.

After receiving the interaction data and the token from the first software module 304 of the mobile device 300, the remote computer 308 can generate an authorization request message (not shown) comprising the interaction data and the token. The remote computer 308 transmits the authorization request message to an authorizing entity computer via a transport computer and a processing network, as described in further detail in reference to FIG. 2. The authorizing entity computer determines whether or not to authorize the interaction and provides an authorization response message to the remote computer 308 via the transport computer and the processing network. The authorization response message can include an indication of whether or not the interaction is authorized.

Upon receiving the authorization response message, at step 370, the remote computer 308 transmits the authorization response message to the first software module 304. The first software module 304 can then determine whether or not the authorization response message indicates that the interaction is authorized. For the example, the first software module 304 can receive an indication that the interaction is authorized. The mobile application 302 can present the indication to the user of the mobile device 300 via a display or other suitable means. The user can then obtain the one or more physical items corresponding to the one or more identifiers. In some embodiments, the indication that the interaction is authorized can be utilized by the user to access the one or more physical items. For example, the indication that the interaction is authorized may act as a receipt or an access code.

Figure 4:
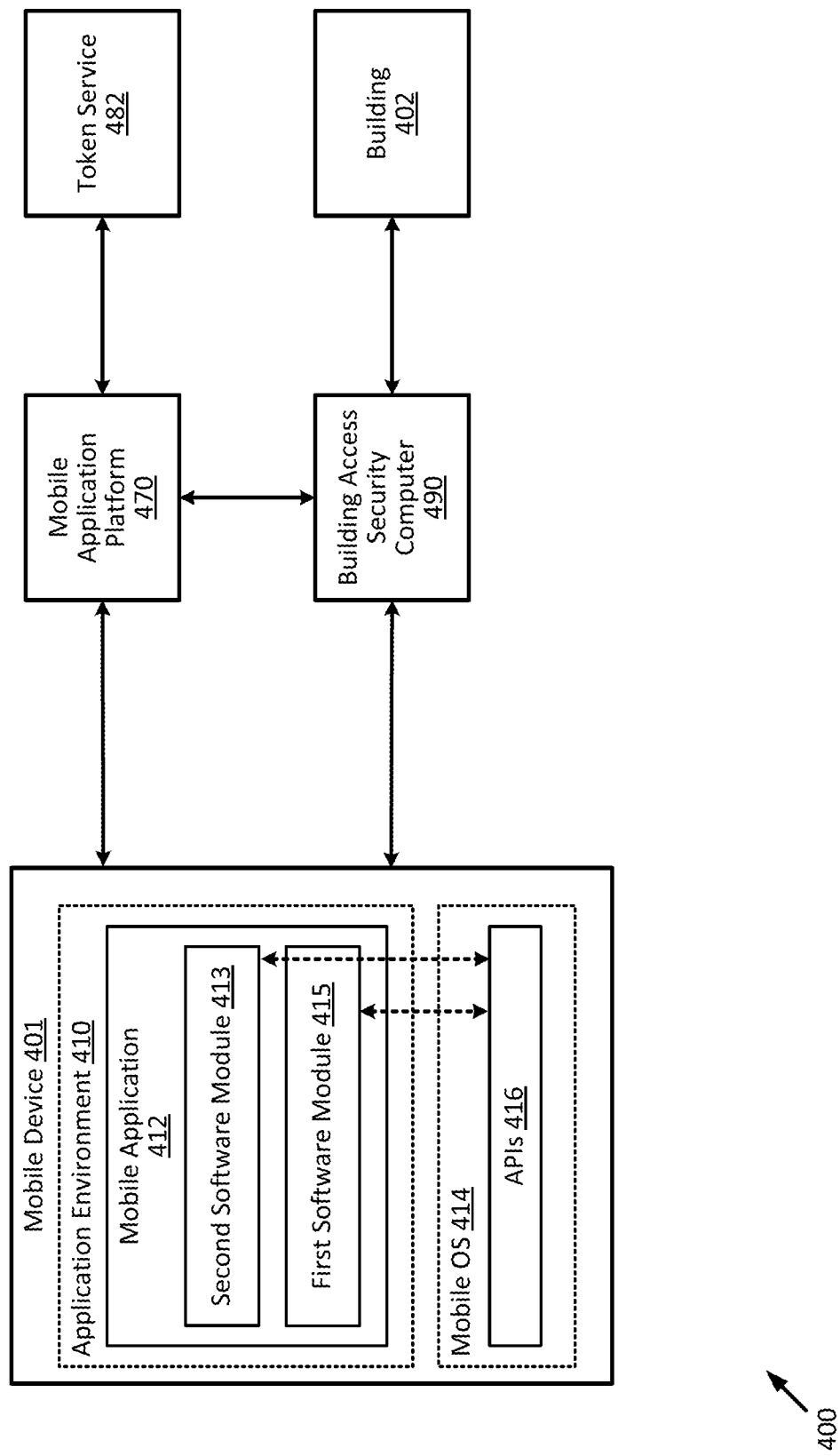
FIG. 4 shows a block diagram of a building access system according to embodiments.

FIG. 4 shows a block diagram of a building access system 400 according to embodiments. FIG. 4 shows a mobile device 401 (e.g., the mobile device 101 FIG. 1) operated by a user. The mobile device 401 can interact with a mobile application platform 470 and a building access security computer 490 (e.g., a device that manages access to the building 402).

An access transaction can be described as follows, the user will scan an identifier at a location at the building 402 with the mobile device 401. For example, a locked door at the building 402 can have a QR code (or other suitable identifier) printed on the door. The user can utilize a QR code scanner on the mobile device 401 to scan the QR code on the door. The mobile application 412 displays an "unlock" button or other element to allow the user to select the option to unlock the scanned door. The user then selects, in the mobile application 412, to unlock the door. The first software module 415 will then receive an identifier associated with the door and any other information embedded in the scanned QR code. The first software module 415 then provides interaction data to the building access security computer 490 (e.g., a remote computer).

After receiving the interaction data, the building access security computer 490 then provides configuration data to the first software module 415. The first software module 415 will communicate with the second software module 413 of the mobile application 412 via the APIs 416 of the Mobile OS 414. The first software module 415 provides the interaction data in to the second software module 413 in a manner consistent with configuration data provided by the building access security computer 490. For example, the first software module 415 can request a token held by the second software module 413. The token can be a credential that attests to the fact that the user may enter the building 402 via the locked door. The second software module 413 can evaluate the received interaction data including the identifier associated with the door. For example, the second software module 413 can determine whether or not the token should be utilized to attempt to access the building 402 via the locked door. The second software module 413 determines that the received identifier matches an identifier associated with the token (e.g., the token can be used in an attempt to unlock the door). The second software module 413 can provide the token to the first software module 415.

Upon receiving the token and any other suitable data (e.g., a cryptogram, etc.) from the second software module 413 via the APIs 416, the first software module 415 transmits the interaction data and the token to the building access security computer 490. The building access security computer 490 then determines whether or not to authorize the interaction (e.g., to allow the user to access the building). For example, the building access security computer 490 can determine whether or not the token is sufficient proof that the user can be authorized access to the building 402. In some embodiments, the building access security computer 490 can transmit a message indicating that the interaction is authorized to the mobile device 401 and/or a electromechanical lock at the door of the building 402.

Technical Advantages

Utilizing the techniques discussed herein, the time required to conduct a transaction may be reduced as a common device may be utilized to store payment credentials, obtain transaction data, and initiate transaction acceptance processing. Rather than utilizing one device for providing payment credentials and another device for acceptance processing, this functionality may be provided in a single device, reducing the overall processing resources required for transaction processing. The techniques herein enable a user to scan physical items, checkout, and pay, without ever needing to search for an access device within the store. Additionally, through host card emulation functionality provided by the on-device cloud based transaction software and the acceptance processing facilitated by the acceptance device software, the transaction can be considered as a card-present transaction because the-device cloud based transaction software is interacting with the acceptance device software locally. Consequently, the transaction is more secure than a conventional e-commerce transaction.

Embodiments provide for a number of additional technical advantages. For example, since an application on the mobile device comprises both the first software module and the second software module complexity of the mobile device can be reduced. For example, the mobile device does not need additional hardware components integrated into the mobile device that allow the various components to communicate. For example, the mobile device can be less complex due to not requiring multiple secure elements and a controller that communicates between the secure elements. Furthermore, since the first software module and the second software module are included in the application, the application can be easily updated and provisioned to the mobile device. The mobile device does not become obsolete when updates are made to the application, since the software modules of the application are not integrated into secure elements (or other hardware) of the mobile device.

Embodiments further provide for the technical advantage of secure communication of sensitive data. For example, the first software module and the second software module can securely communicate with one another via API calls and API responses. The application programming interface exposed by the second software module, that stores a token, can more securely hide the token from malicious token requests than previous methods of a digital wallet storing a token and providing the token to merchants upon request.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising steps including:
    a) receiving, at a first software module on a mobile device, the mobile device comprising the first software module configured to execute acceptance processing and a second software module configured to manage payment credentials and/or tokens and to emulate a user device associated with a user, one or more identifiers associated with one or more physical items external to the mobile device, the one or more identifiers being read by the mobile device using an input component in a purchase transaction;
    after step a), b) receiving, by the first software module, configuration data from a remote computer, the configuration data configuring the first software module to translate data in one data format compatible with the second software module to another different data format compatible with the remote computer, thereby allowing the second software module to communicate with the remote computer via the first software module;
    c) receiving, at the first software module, an indication that an authorization request is to be initiated;
    d) exchanging, between the first software module and the second software module of the mobile device, interaction data associated with the one or more physical items and a token associated with the user by:
        providing, by the first software module, an API call comprising the interaction data to the second software module, wherein the second software module evaluates the interaction data and the first software module and determines whether or not to respond to the API call based on a determination that the first software module is authentic and the interaction data; and
        responsive to the evaluation, receiving, by the first software module, an API response comprising the token from the second software module; and
    e) transmitting, by the first software module, the interaction data and the token associated with the user to the remote computer comprising acceptance processing software with which the first software module has registered in order to enable the first software module to exchange information with the remote computer, the transmitting causing the remote computer to generate an authorization request message for the purchase transaction, the authorization request message comprising the interaction data and the token.

2. The method of claim 1, wherein the first software module is hosted by a resource provider, and wherein the mobile device is operated by an entity different from the resource provider associated with the first software module.

3. The method of claim 1 wherein the configuration data further includes a set of rules associated with interaction processing.

4. The method of claim 3, wherein providing, by the first software module, the API call to the second software module is based on the configuration data.

5. The method of claim 1, wherein the API response further includes a cryptogram associated with the token.

6. The method of claim 1, wherein the first software module communicates directly with the second software module via the API call and the API response.

7. The method of claim 1, wherein the one or more physical items are involved in an interaction between the user of the mobile device and a resource provider that hosts the first software module, wherein the remote computer provides the authorization request message to an authorizing entity computer and wherein the authorizing entity computer determines whether or not to authorize the interaction and generates an authorization response message, and wherein the method further comprises:
    receiving, by the first software module, the authorization response message comprising an indication of whether or not the interaction is authorized from the remote computer; and
    displaying, by the first software module, the indication of whether or not the interaction is authorized to the user.

8. The method of claim 1, wherein the input component includes a code scanner, a reader, a camera, or one or more RF (radio frequency) transceivers that send and receive communications.

9. The method of claim 1, wherein prior to exchanging, between the first software module and the second software module of the mobile device, the interaction data associated with the one or more physical items and the token associated with the user, the method further comprises:
    receiving, by the second software module of the mobile device, the token from a mobile application platform; and
    storing, by the second software module of the mobile device, the token in a secure element of the mobile device, whereby the first software module cannot access the token without the second software module.

10. A mobile device comprising:
    one or more processors; and
    one or more memories storing computer executable instructions that, when executed by the one or more processors, cause the mobile device to perform a method comprising steps including:
        a) receiving, at a first software module on the mobile device, the mobile device comprising the first software module configured to execute acceptance processing and a second software module configured to manage payment credentials and/or tokens and to emulate a user device associated with a user, one or more identifiers associated with one or more physical items external to the mobile device, the one or more identifiers being read by the mobile device using an input component in a purchase transaction;

after step a), b) receiving, by the first software module, configuration data from a remote computer, the configuration data configuring the first software module to translate data in one data format compatible with the second software module to another different data format compatible with the remote computer, thereby allowing the second software module to communicate with the remote computer via the first software module;

c) receiving, at the first software module, an indication that an authorization request is to be initiated;

d) exchanging, between the first software module and the second software module of the mobile device, interaction data associated with the one or more physical items and a token associated with the user by:

providing, by the first software module, an API call comprising the interaction data to the second software module, wherein the second software module evaluates the interaction data and the first software module and determines whether or not to respond to the API call based on a determination that the first software module is authentic and the interaction data; and responsive to the evaluation, receiving, by the first software module, an API response comprising the token from the second software module; and e) transmitting, by the first software module, the interaction data and the token associated with the user to the remote computer comprising acceptance processing software with which the first software module has registered in order to enable the first software module to exchange information with the remote computer, the transmitting causing the remote computer to generate an authorization request message for the purchase transaction, the authorization request message comprising the interaction data and the token.

11. The mobile device of claim 10 further comprising:
a secure element; and
the input component.

12. The mobile device of claim 10, wherein prior to exchanging, between the first software module and the second software module of the mobile device, the interaction data associated with the one or more physical items and the token associated with the user further comprises:

receiving a selection of a selected user device of a plurality of user devices presented on the mobile device, wherein the selected user device is the user device.

13. The mobile device of claim 10, wherein prior to receiving, at the first software module, the one or more identifiers associated with the one or more physical items, wherein the steps further comprise:

receiving, by the second software module, user credentials via an interface provided by the second software module;

transmitting, by the second software module, a token request comprising the user credentials to a mobile application platform, wherein the mobile application platform requests the token for the user credentials from a token service; and receiving, by the second software module, the token from the mobile application platform.

14. The mobile device of claim 10, wherein the configuration data further defines a set of rules associated with interaction processing.

15. The mobile device of claim 14, wherein providing, by the first software module, the API call to the second software module is based on the configuration data.

16. The mobile device of claim 10, wherein the first software module is hosted by a resource provider, and wherein the mobile device is operated by an entity different from the resource provider associated with the first software module.

17. The mobile device of claim 10, wherein the one or more identifiers include one or more barcodes and/or one or more QR codes.

18. The mobile device of claim 10, wherein the steps further comprise exchanging, between the first software module and the second software module of the mobile device, a cryptogram associated with the token.

19. A system comprising:
a remote computer; and
a mobile device comprising:
one or more processors; and
one or more memories storing computer executable instructions that, when executed by the one or more processors, cause the mobile device to perform a method comprising steps including:

a) receiving, at a first software module on the mobile device, the mobile device comprising the first software module configured to execute acceptance processing and a second software module configured to manage payment credentials and/or tokens and to emulate a user device associated with a user, one or more identifiers associated with one or more physical items external to the mobile device, the one or more identifiers being read by the mobile device using an input component in a purchase transaction;

after step a), b) receiving, by the first software module, configuration data from the remote computer, the configuration data configuring the first software module to translate data in one data format compatible with the second software module to another different data format compatible with the remote computer, thereby allowing the second software module to communicate with the remote computer via the first software module;

c) receiving, at the first software module, an indication that an authorization request is to be initiated;

d) exchanging, between the first software module and the second software module of the mobile device, interaction data associated with the one or more physical items and a token associated with the user by:

providing, by the first software module, an API call comprising the interaction data to the second software module, wherein the second software module evaluates the interaction data and the first software module and determines whether or not to respond to the API call based on a determination that the first software module is authentic and the interaction data; and responsive to the evaluation, receiving, by the first software module, an API response comprising the token from the second software module; and e) transmitting, by the first software module, the interaction data and the token associated with the user to the remote computer comprising acceptance processing software with which the first software module has registered in order to enable the first software module to exchange information with the remote computer, the transmitting causing the remote computer to generate an authorization request message for the purchase transaction, the authorization request message comprising the interaction data and the token.

20. The system of claim 19, wherein the remote computer further comprises:

one or more processors; and one or more memories storing computer executable instructions that, when executed by the one or more processors, cause the mobile device to perform operations comprising:
- providing, by the remote computer, the configuration data, wherein the configuration data defines a set of rules associated with interaction processing;
- receiving, by the remote computer, the interaction data and the token associated with the user from the mobile device;
- generating, by the remote computer, the authorization request message comprising the interaction data and the token; and
- transmitting, by the remote computer, the authorization request message to an authorizing entity computer to cause the authorizing entity computer to determine whether or not to authorize an interaction.

* * * * *